United States Patent [19]
Mantha et al.

[11] Patent Number: 6,163,779
[45] Date of Patent: Dec. 19, 2000

[54] METHOD OF SAVING A WEB PAGE TO A LOCAL HARD DRIVE TO ENABLE CLIENT-SIDE BROWSING

[75] Inventors: Murthy L. Mantha, Austin; Manish M. Modh, Round Rock; Sockalingam Radhakrishnan; Viktors Berstis, both of Austin, all of Tex.

[73] Assignee: International Business Machines Corporation, Armonk, N.Y.

[21] Appl. No.: 08/939,812

[22] Filed: Sep. 29, 1997

[51] Int. Cl.$^7$ ..................................................... G06F 17/30
[52] U.S. Cl. ................................ 707/100; 707/1; 707/10; 707/104; 707/500; 707/501; 707/513; 709/203
[58] Field of Search .................................. 707/100, 3, 4, 707/500, 102, 1, 10, 104, 501, 513; 395/200.31; 709/203

[56] References Cited

U.S. PATENT DOCUMENTS

| | | | |
|---|---|---|---|
| 5,737,619 | 4/1998 | Judson | 707/500 |
| 5,761,683 | 6/1998 | Logan et al. | 707/513 |
| 5,774,660 | 6/1998 | Brendel et al. | 395/200.31 |
| 5,781,909 | 7/1998 | Logan et al. | 707/200 |
| 5,802,299 | 9/1998 | Logan et al. | 709/218 |
| 5,845,299 | 12/1998 | Arora et al. | 707/513 |

OTHER PUBLICATIONS

Seybold Publications Inc. "Editorial Aid—The Offline Browser", The Seybold Report on Desktop Publishing, v10, p24 (pp. 4 of 4), Jul. 8, 1996.

Melissa J. Perenson, "Your Web Surfing Companion", PC Magazine, v15, p73 (p. 1 of 1), Sep. 10, 1996.

Justin Hibbard, "Web Suites Threaten Add–On Packages. (Microsoft's Internet Explorer 4.0 and Netscape's Communicator Web Suites Include Features Previously Available Only Via Add–Ons)", Computerworld, v31, p6 (pp. 3 of 3), Mar. 3, 1997.

newsbytes, "Internet Software Update—Fast Offline Browser", Newsbytes Inc, Aug. 23, 1996.

Herb Bethoney, "Save It For Later With Webclip; Offline Browser Eases Organization of Downloaded Pages", PC Week, v13, p98 (pp. 2 of 2), Aug. 19, 1996.

Bryan Hastings, "Webex: Download Now, Hyperbrowse Later:", PC World, v14, p98 (pp. 2 of 2), Oct. 1996.

Paula Rooney, "Lotus Spins Weblicator: Company is Adapting Notes Code for Offline Browser Replication", PC Week, v13, p6 (pp. 2 of 2), Oct. 14, 1996.

(List continued on next page.)

*Primary Examiner*—John Breene
*Assistant Examiner*—Cheryl R. Lewis
*Attorney, Agent, or Firm*—Jeffrey S. LaBaw; David H. Judson

[57] ABSTRACT

A method of copying a Web page presented for display on a browser of a Web client. The Web page comprises a base HTML document and a plurality of hypertext references, one or more of which may be associated with embedded objects (such as image files). The operation begins by copying the base HTML document to the client local storage and establishing a pointer to the copied document. A first linked list of the hypertext references in the base document is then generated. Thereafter, and for each hypertext reference in the first linked list, the following operations are performed. If the hypertext reference refers to an embedded object in the base HTML document, the embedded object is saved on the client local storage and the file name of the saved embedded object is stored (as a fully-qualified URL) in a second linked list. If the hypertext reference does not refer to an embedded object in the base HTML document, the fully-qualified URL of the hypertext reference is stored in the second linked list. Then, the fully-qualified URLs of the second linked list (including those associated with the stored images) are updated to point to the files located on the client local storage. At the end of this operation, there is a new HTML page with links for images pointing to files on the local hard drive. When the user desires to retrieve the copied page, a link to the pointer is activated.

23 Claims, 10 Drawing Sheets

OTHER PUBLICATIONS

Bruce Robertson, "Houston. Anyone. Everyone. Do You Copy? (Local Copies of Distant Data) (In The Middle) (Technology Information)", Network Computing, v7, p102 (pp. 4 of 4), Mar. 1, 1997.

John Morris and Scot Finnie, "The Browser Push Is On.", PC Magazine, v16,p123 (pp. 6 of 6), Sep. 9, 1997.

Jim O'Brien, "Software Web Accelerators Cache In On Wasted Bandwidth", Computer Shopper, v16, p644 (pp. 4 of 4), Mar. 1997.

Kathleen Caster, "Searching. (Using Web Search Engines)," Windows Sources, v5, p198 (pp. 7 of 7), Jul. 8, 1996.

⇩ CLICK ON "SAVE"

FIG. 5B

⇩ CLICK ON "CHANGE"

```
<TR><TD ALIGN=RIGHT><FONT SIZE=5><B><A HREF="/ceramics.html"
onMouseOver="window.status='Functional, decorative, architectural and
sculpture,' ; return true ">Ceramics</A></B></FONT>
     <TD><A HREF="ceramics.html" onMouseOver="window.status='Functional,
decorative, architectural and sculpture, ' ; return true "><IMG HEIGHT=60
WIDTH=60 BORDER=0 ALT="Ceramics" SRC="/icons/ceramics_t.jpg"></A>
```
} 115

---

```
<TR><TD ALIGN=RIGHT><FONT SIZE=5><B><A
HREF="http://www.artscape.com/ceramics.html"
onMouseOver="window.status='Functional, decorative, architectural and
sculpture.' : return true ">Ceramics</A></B></FONT>
     <TD><A HREF="http://www.artscape.com/ceramics.html"
onMouseOver="window.status='Functional, decorative, architectural and
sculpture.' ; return true "><IMG HEIGHT=60 WIDTH=60 BORDER=0 ALT="Ceramics"
SRC="file:///c|/user/copies/C1/I1.jpg"></A>
```
} 117

METHOD OF SAVING A WEB PAGE TO A LOCAL HARD DRIVE TO ENABLE CLIENT-SIDE BROWSING

BACKGROUND OF THE INVENTION

1. Technical Field

The present invention relates generally to a technique for making a local copy of a Web page to facilitate client-side browsing of the page content.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document formatted according to HTML.

A typical Web page consists of a number of individual files including a base HTML document as well as a plurality of embedded image files (typically identified by their .gif or .jpeg extensions). Web browser programs temporarily cache some Web page content to obviate unnecessary server access (e.g., if the page and/or file is current and is already present on the client) and thus enhance performance. A browser cache, however, maintains the individual files that comprise the Web page in a structured list and not as a composite page. In some Web machines (e.g., a Web appliance), the browser cache is not even accessible to the user.

In today's Web environment, Web page content is often updated, sometimes on a daily or even hourly basis. This provides a significant advantage in that the user has access to current information and news. A disadvantage, however, is that information that may have been current an hour ago or yesterday may be out-of-date when the user revisits the Web page. It would be highly desirable to provide a mechanism to enable the user to take a "snap shot" of a given Web page so that the page (as then displayed) could be stored for subsequent retrieval. The browser cache mechanism does not have this capability. Thus, the only other option is for the user to make a hard copy of the Web page. If, however, the user did not make a hard copy of the prior page (when it was initially being viewed), then he or she will be unable to retrieve that content at a later time.

It would be very desirable to provide a user a simple technique to take a "snap shot" of a particular Web page that could be stored on the client machine and then retrieved for subsequent viewing or use.

SUMMARY OF THE INVENTION

It is a primary goal of the present invention to provide a method for copying or "saving" a Web page onto a local storage to enable a user to browse the page at a subsequent time.

It is another object of the invention to take a "snap shot" of a particular Web page so that, even if the Web page content changes or the Web site is no longer accessible, the user still possesses a desired version of the page.

Another object of this invention is to copy and save a Web page according to a desired category to facilitate subsequent retrieval and display of the page.

A still further object of this invention is to enhance the operation of a World Wide Web browser.

It is still another object of this invention to provide a mechanism for making a copy of particular Web page content being displayed by a browser.

The preferred solution is to save a copy of the HTML base document and each of its embedded objects (e.g., image files, sound files and/or video files) on a client hard drive. Hypertext references in the HTML base document that are associated with the embedded objects are changed to point to the hard drive, while other hypertext references in the HTML base document are stored as fully-qualified network URLs. Thus, when the user later brings up the copied page, the page comes up immediately as the normal client pull operation to the server is avoided.

In response to a user's request to save a copy of a Web page being displayed, the following steps are preferably performed. The base HTML document is first copied into a new HTML page on the local hard drive and a pointer to the new HTML page is established. The pointer may be associated with a particular category so that "related" pages (e.g., by subject matter) may be collected and sorted together. The original page (i.e. the base HTML document) is then parsed to prepare a list of hypertext references (namely "links"). Such references are typically represented by <a href> markup tags. For each reference tag in the base HTML document that is an embedded object (e.g., an image), a copy of that file is retrieved from the server (or perhaps from browser cache) and then saved on the local hard drive. In the new HTML page (namely, the page located on the local drive), the path name to the stored file is substituted for the original hypertext reference. When a user desires to view the copied page, the user activates a link to the pointer, preferably from a menu associated with the category. Thus, according to the invention, Web pages are saved by categorizing the saved pages according to subject matter (e.g., work, hobbies, children, etc.) and saving the pointer(s) to the copied page(s).

According to a more specific aspect of the present invention, a method of copying a Web page presented for display on a browser of a Web client begins by copying the base HTML document of the Web page to the client local storage. A first linked list of the hypertext references (i.e. the <a href> markup tags) in the base document is then generated. Thereafter, and for each hypertext reference in the base document associated with an embedded object, a file copy of the embedded object is saved to the client local storage, and a fully-qualified URL to the saved object (i.e. a path name to the local storage) is stored into a second linked list. Preferably, the object (e.g., an image) is retrieved from the network while a "Copy in progress" indication page is displayed to the user. Other hypertext references in the base HTML document are also stored in the second linked list as fully-qualified URLs (namely, URLs pointing to network addresses). When the user desires to retrieve the copy, a link to the pointer is activated.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE PREFERRED EMBODIMENT

Figure 1:
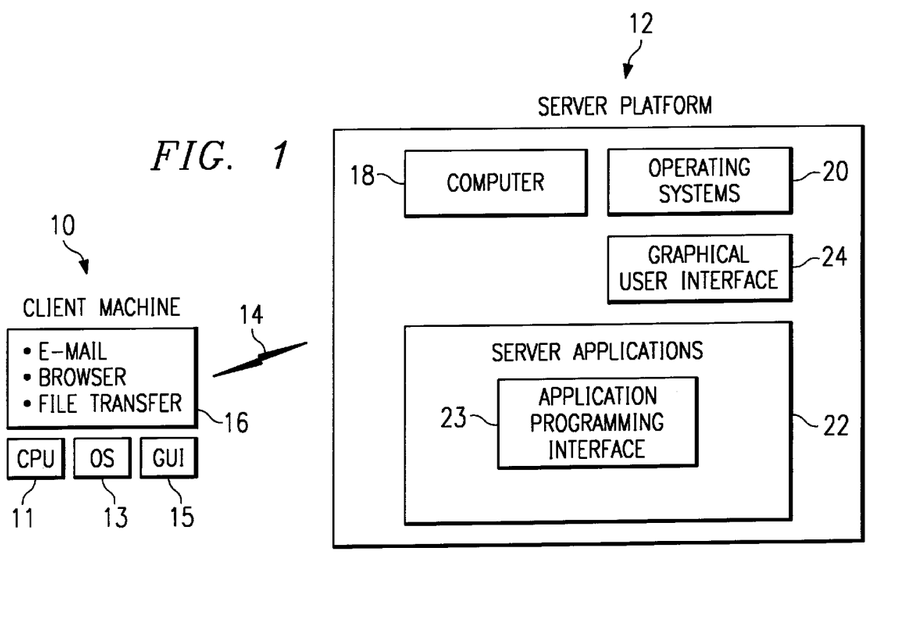
FIG. 1 is a representative system in which the present invention is implemented.

A representative system in which the present invention is implemented is illustrated in FIG. 1. An Internet client machine 10 is connected to a server platform 12 via a communication channel 14. For illustrative purposes, channel 14 is the Internet, an Intranet or other known connection. In the case of the Internet, server platform 12 is one of a plurality of servers which are accessible by clients, one of which is illustrated by machine 10. A client machine typically includes a processor 11, an operating system 13, a graphical user interface (GUI) 15, and a suite of known Internet tools 16 to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

By way of example only, a client machine is a personal computer such as a desktop of notebook computer, e.g., an IBM® or IBM-compatible machine running under the OS/2® operating system, an IBM ThinkPad® machine, or some other Intel x86 or Pentium®-based computer running Windows 3.1 or greater operating system. A representative server platform 12 comprises an IBM RISC System/6000 computer 18 (a reduced instruction set of so-called RISC-based workstation) running the AIX (Advanced Interactive Executive Version 4.1 and above) Operating System 20 and Server program(s) 22. The platform 12 also includes a graphical user interface (GUI) 24 for management and administration. It may also include an application programming interface (API) 23. HTTP GET requests are transferred from the client machine to the server platform, typically via a dial-up computer network, to obtain documents or objects formatted according to HTML or some other markup language. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/server combinations may be used.

Figure 2A:
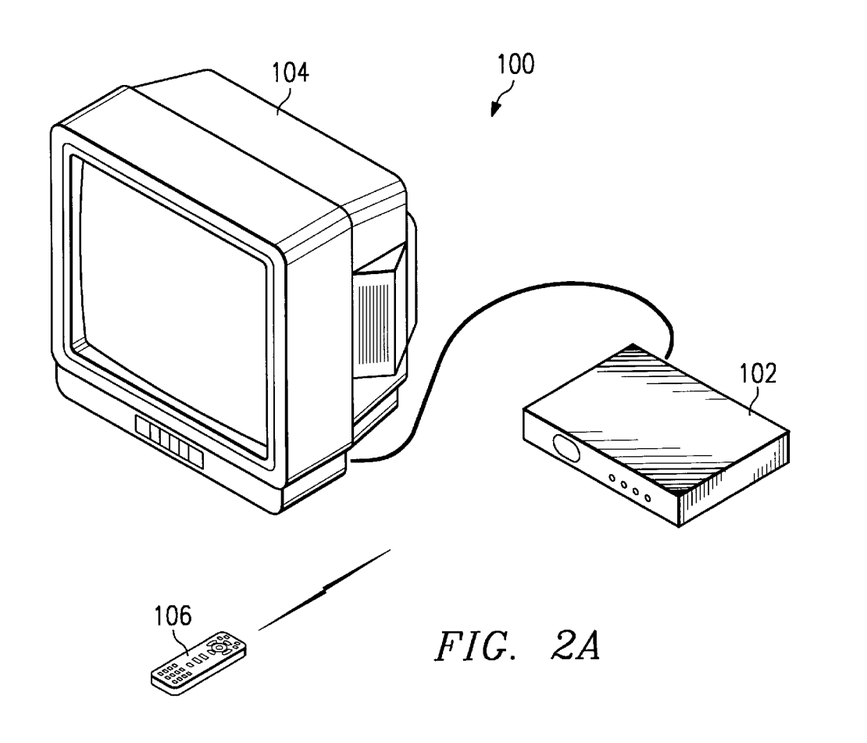
FIG. 2A is pictorial representation of a data processing system unit connected to a conventional television set to form a "Web" appliance.

Alternatively, the Internet client may be a data processing system or a so-called "Web appliance" such as illustrated in FIGS. 2A–2D and 3. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items. If the Web appliance is used in a public environment (e.g., a kiosk or as a standalone Internet terminal in a public location), the remote control unit 106 may be tethered to the remainder of the appliance or it may omitted.

Figure 2B:
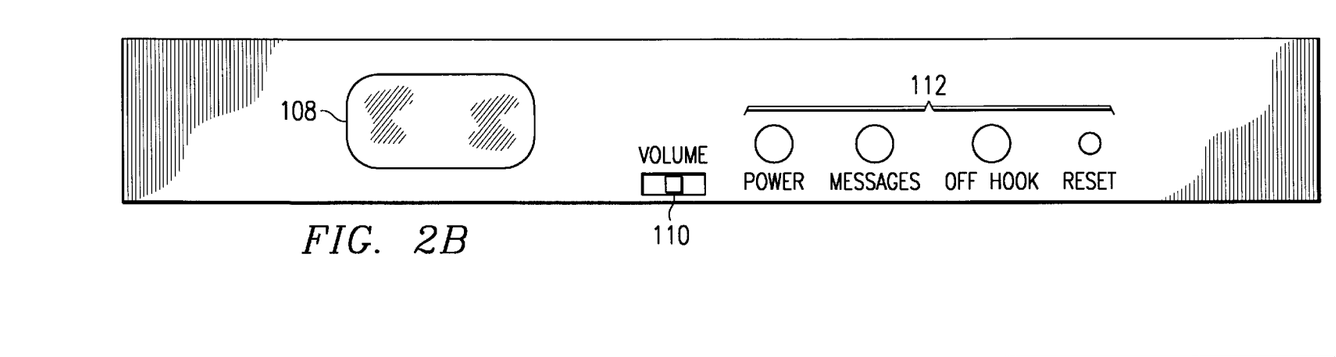
FIG. 2B is a pictorial representation of a front panel of the data processing system unit.

FIG. 2B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
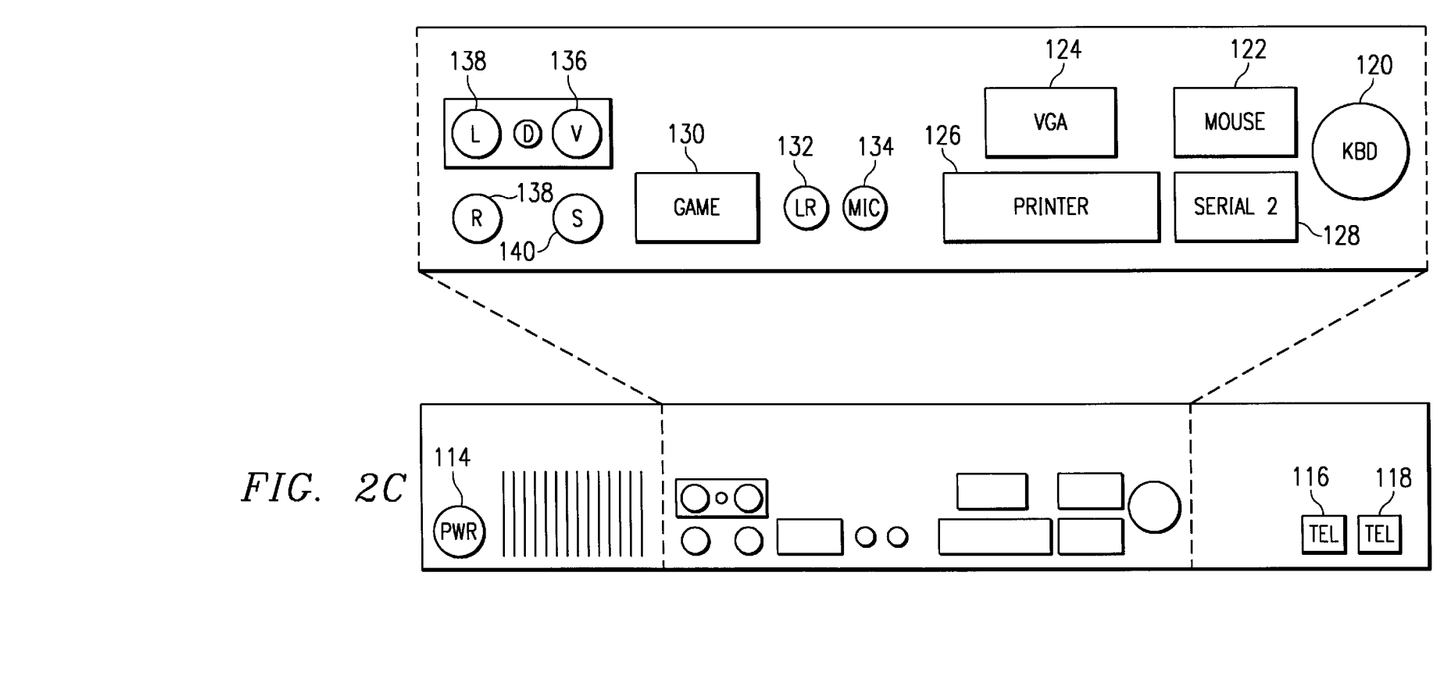
FIG. 2C is a pictorial representation of a rear panel of the data processing system unit.

FIG. 2C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 2D:
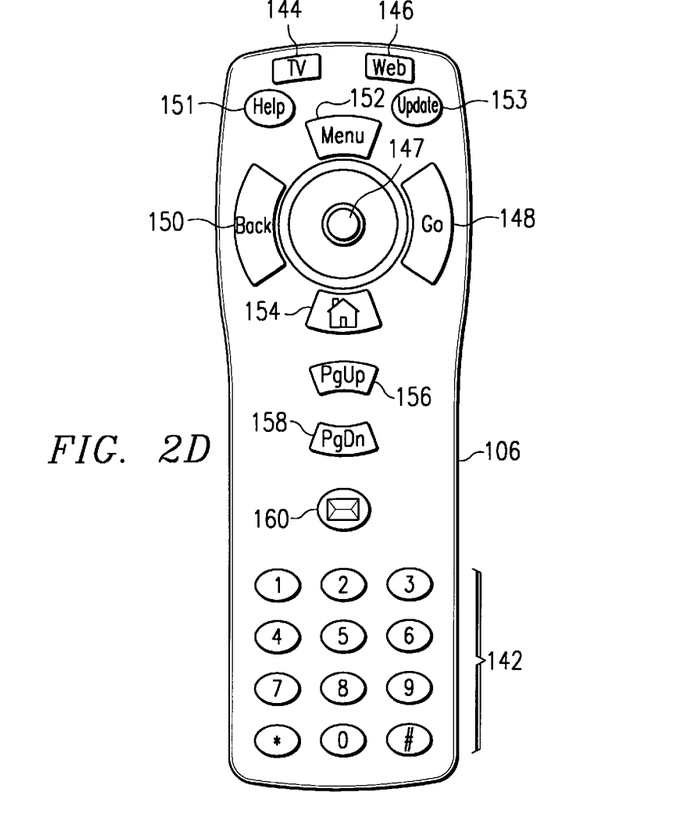
FIG. 2D is a pictorial representation of a remote control unit associated with the data processing system unit.

FIG. 2D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
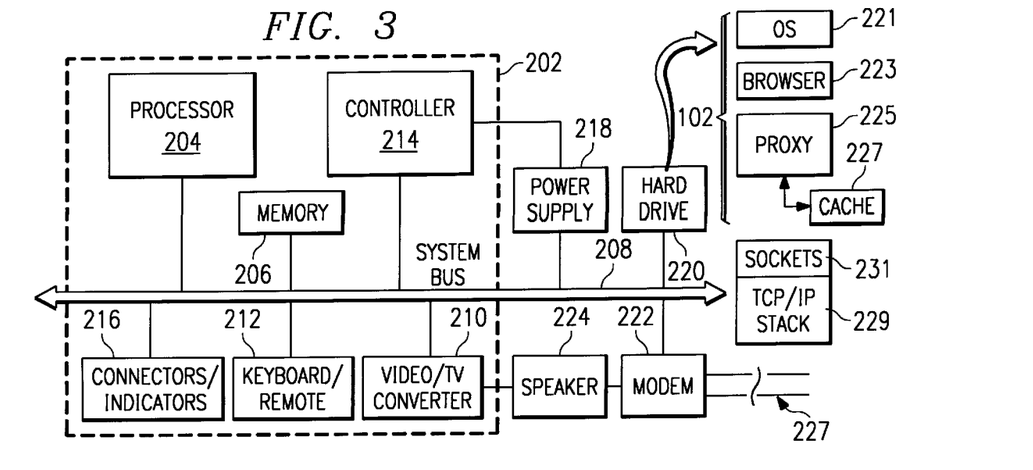
FIG. 3 is a block diagram of the major components of the data processing system unit.

Referring now to FIG. 3, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. Hard drive 220 may also support an SMTP mechanism to provide electronic mail, an FTP mechanism to facilitate file transfers from Internet FTP sites, and other Internet protocol mechanisms, all in a known manner. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V.42bis, V.34, V.17 Fax, MNP 1-5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet (not shown).

Those skilled in the art will recognize that the components depicted in FIGS. 2A–2D and 3 and described above may be varied for specific applications or embodiments. Such variations in which the present invention may be implemented are considered to be within the spirit and scope of the present invention.

The client machine (typically the hard drive 220) also includes a proxy 225. Preferably, the proxy is implemented in software and includes a cache 227 associated therewith. The cache may be integral to the proxy or logically associated therewith. Typically, cache 227 is distinct from the client cache. The cache preferably has a size up to several hundred megabytes, which is substantially larger than the standard cache associated with a browser such as Netscape Navigator. The client machine also includes a protocol stack 229 (e.g., a TCP/IP protocol stack) and a sockets mechanism 231, which are used to support communications in a known manner. According to the invention, the proxy 225 is advantageously located on the client along with the browser. Thus, the proxy is sometimes referred to as a "client side" proxy.

Figure 4:
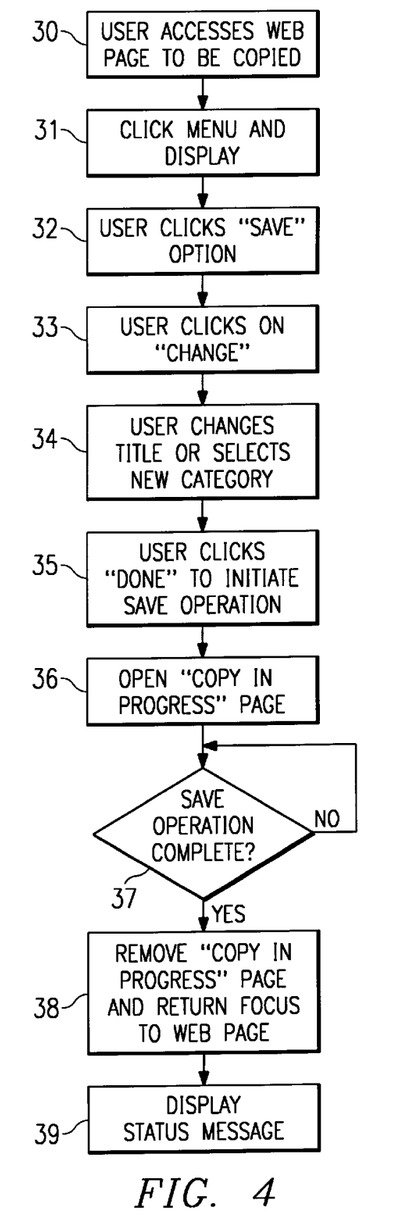
FIG. 4 is a flowchart of the basic operation for initiating a Save operation and associating the operation with an identifiable Category according to the method of the present invention.

FIG. 4 illustrates a flowchart of a preferred operation for initiating a "Save" (sometimes referred to as a "copy") operation and associating the operation with an identifiable "Category" according to the method of the present invention. Typically, the method is implemented in a client machine such as the personal computer (such as shown in FIG. 1) or the Web appliance (such as shown in FIGS. 2A–2D and 3). One of ordinary skill will appreciate that during the method, a user may be guided through the operation by various on-screen dialogs or menus displayed on the display screen. Various exemplary screen displays are set forth in FIGS. 5A–D. The method illustrated in the flowchart of FIG. 4 is designed to be implemented in the Web appliance. An exemplary routine begins at step 30 with the user accessing a Web page to be copied. This may be accomplished in the Web appliance system previously illustrated in a number of ways. Thus, for example, the user may navigate to a particular home page by clicking HOME from the remote control. By then clicking on an Explore icon, the browser navigates to a search engine. The user then enters the search criteria that leads to the desired page, all in a known manner. Alternatively, the user clicks on the Menu button 152 and then GOTO from the remote control. This brings up a GOTO dialog with a blank entry field. The user then types in the URL and clicks DONE.

Figure 5A:
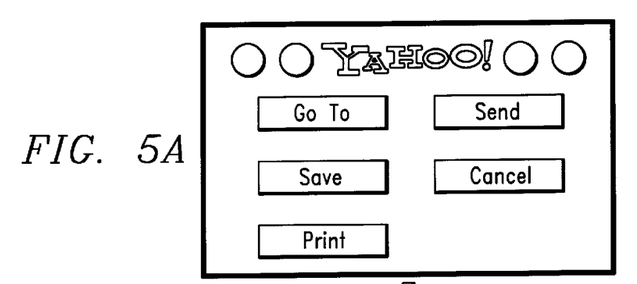
FIG. 5A is a representative screen display of a Web page and on-screen menu buttons for use in initiating the save operation.
Figure 5B:
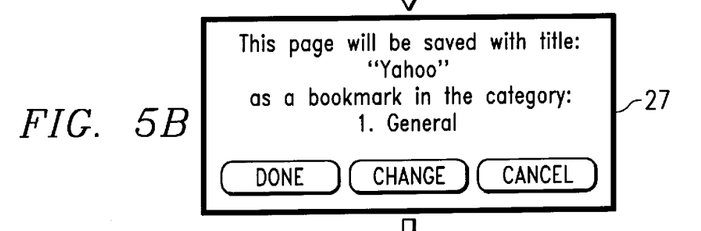
FIG. 5B is a screen display of a representative Save Dialog box from which the user may identify a Category for the Web page to be saved.
Figure 5C:
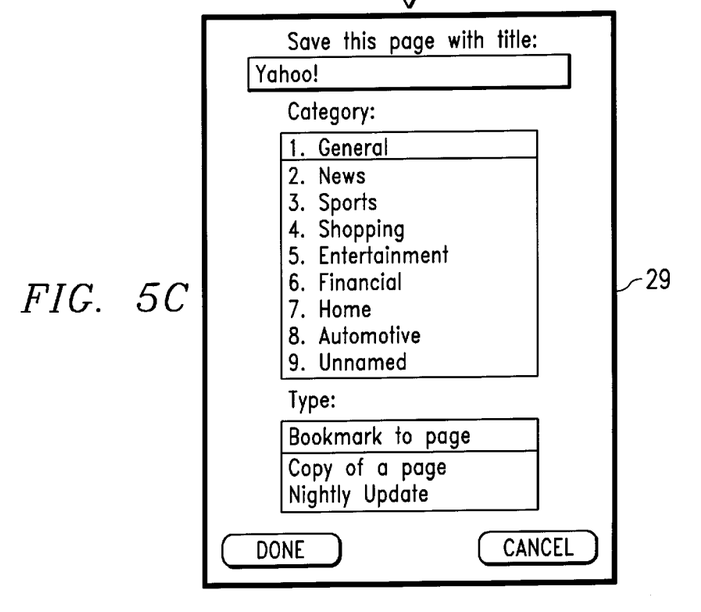
FIG. 5C is a screen display of a representative Save Dialog box from which the user may select a different category for the Web page to be saved.

After the desired Web page is accessed (or is otherwise being displayed), the routine continues at step 31 with the user clicking the menu button. At this point, an on-screen menu is displayed as shown in FIG. 5A. At step 32, the user clicks on SAVE, which brings up a first Dialog box 27 such as shown in FIG. 5B. This box preferably shows the title of the page together with a "Category" in which the page will be saved. By saving pages in one or more Categories, the copied pages are more easily located for subsequent retrieval. The Category number preferably defaults to a last category in which a link was saved (in this case, Category 1 for "General").

Figure 5D:
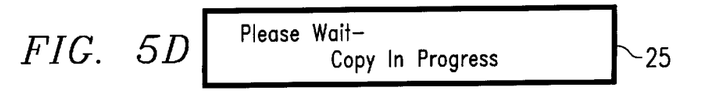
FIG. 5D is a representative screen display of a progress indication page according to the present invention.

At step 33, the user may change the category by clicking CHANGE. This action brings up a second Save Dialog box 29 such as shown in FIG. 5C. From the second box, the routine continues at step 34 with the user changing the title (if desired) and/or selecting a new category. The box also includes a Type request field that is clicked by the user to indicate that a "copy of a page" is desired. Alternatively, the Type field may designate a "Bookmark," or a "Nightly Update". At step 35, the user clicks DONE to initiate the copy. In particular, at step 36, a progress indication page 25 is opened on the browser as shown in FIG. 5D. This "Copy in progress" page is advantageous for several reasons. First, the progress indication page provides visual feedback to the user that a copy of the page is in progress. Second, the browser preferably relinquishes focus on the Web page being copied. As will be seen, this enables the inventive method to obtain information about the page so that the copy function may be expedited. At step 37, a test is done to determine whether the local storage save operation is complete. If the outcome of the test at step 37 is negative, the routine cycles. If, however, the outcome of the test at step 37 is positive, which indicates that the copy operation is complete, the original Web page is again displayed at step 38. In particular, the progress indication page is closed and the browser returns to its original focus. At step 39, the routine continues by displaying a status message (e.g., in the status bar at the bottom of the browser) to indicate to the user that the copy operation is complete. This message may be displayed until some predetermined action takes place (e.g., the mouse is moved over some hypertext link in the page).

Figure 6:
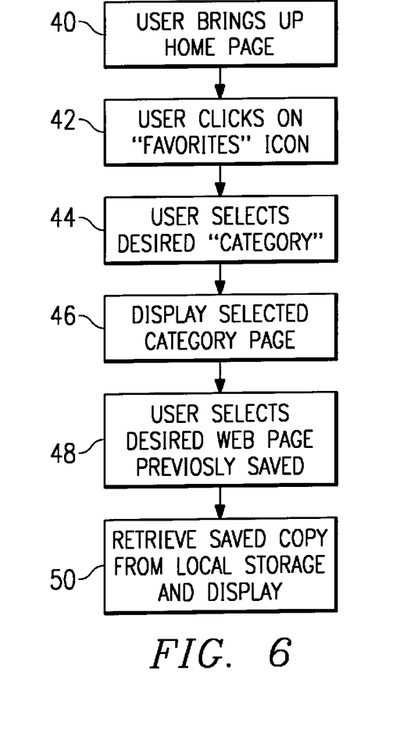
FIG. 6 is a detailed flowchart of a method for accessing the Web page copied to the local hard drive via the Save operation.
Figure 7A:
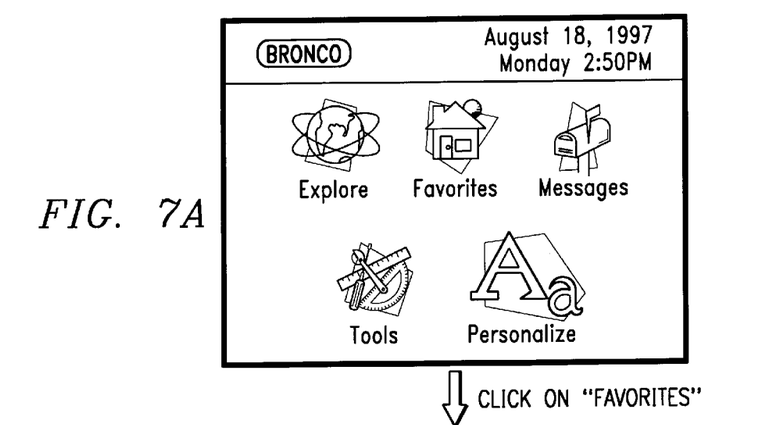
FIG. 7A is a representative screen display of a home page from which a previously-saved page may be accessed.
Figure 7B:
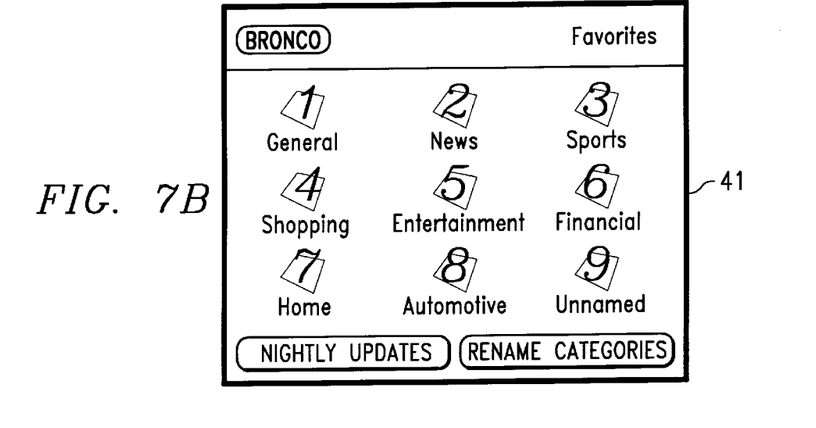
FIG. 7B is a representative screen display of a favorites page from which a previously copied page may be accessed for viewing.
Figure 7C:
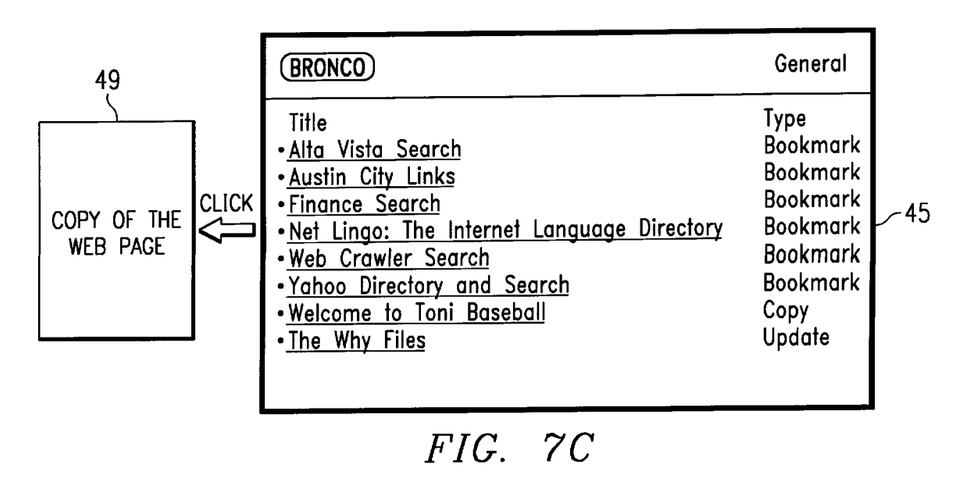
FIG. 7C is a representative screen display of a Category page from which the previously copied page is accessed.

FIG. 6 is a flowchart describing how the user (or a third party, if the pointer to the saved page were otherwise available) may access the copy of the Web page copied to the local hard drive via the Save operation. Exemplary screen displays are shown in FIGS. 7A–E. The routine begins at step 40 with the user bringing up a home page (see FIG. 7A). At step 42, the user clicks on the Favorites icon, which causes the display (FIG. 7B) of a Favorites page 41. At step 44, the user clicks on the desired category icon in the Favorites page. Alternatively, the user clicks a category number (e.g., 1–9) from the remote control (in lieu of step 44). At step 46, the selected page is displayed. In this example, the user has clicked on the General Category page 45 (see FIG. 7C). Each Title on the General Category page 45 has a Type, e.g., Bookmark, Copy or Nightly Update. At step 48, the user selects the desired title, which in this example is the "Copy" that was saved on the local hard drive. As the cursor is moved over the title, the title of the page may be displayed in the status bar of the browser. At step 50, the copied Web page 49 is retrieved from the local hard drive and displayed on the browser. This operation is performed without pulling the Web page from the computer network.

Figure 8:
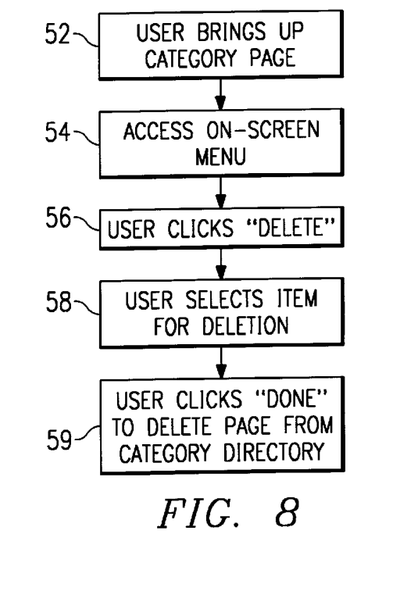
FIG. 8 is a flowchart of method for deleting a saved Web page from the user's local hard drive storage.

A method for deleting a saved Web page copy is shown in the flowchart of FIG. 8. The routine begins at step 52 with the user bringing up the Category page (e.g., by clicking a number 1–9) from the remote control in which the Web page was stored. At step 54, the on-screen menu is accessed by clicking the Menu button from the remote control. The routine then continues at step 56 with the user clicking DELETE. This brings up a "Delete Items" page. At step 58, the user clicks on DELETE with respect to the link to be deleted. This operation marks the item for deletion. At step 59, the user clicks DONE to make the change effective. This deletes the Web page.

Figure 9:
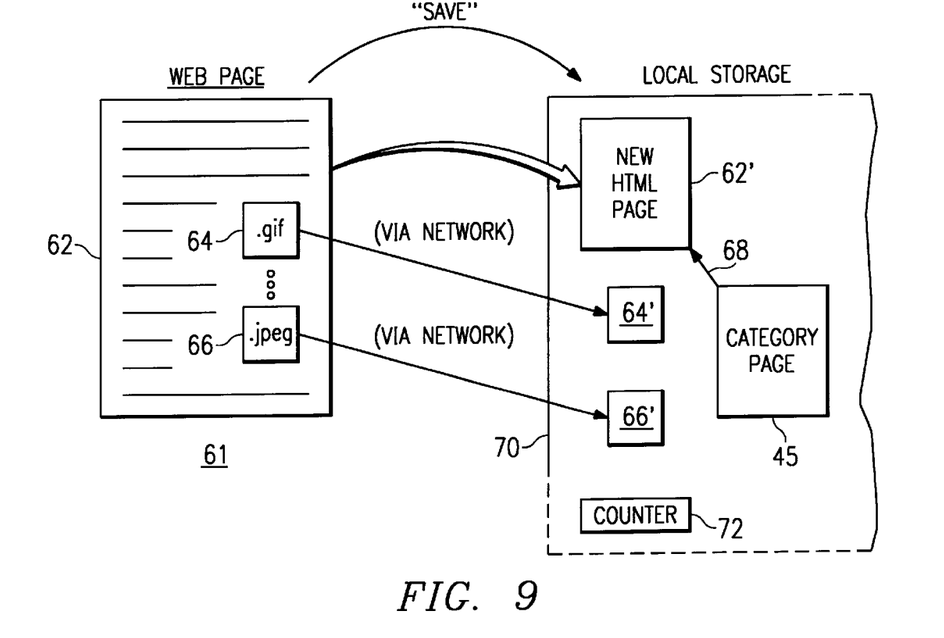
FIG. 9 is a representative Web page illustrating the Save operation.

A more detailed description of the save operation is now provided. By way of brief background, and as seen in FIG. 9, a representative Web page 61 includes a base HTML document 62 and one or more embedded objects such as .gif file 64 and .jpeg file 66. As used herein, an "embedded object" should be broadly construed to cover any type of image file (e.g., a .gif, .jpeg. or .png type), an audio file (e.g., a .wav file) an animation and/or a video (e.g., a .mpeg or .mov file). Referring back to FIG. 9, in the preferred embodiment, the copy operation saves one HTML page 62' on the local hard drive 70 corresponding to the base HTML document 62, and one file (e.g., reference numerals 64' and 66') for each saved embedded object. Thus, new HTML page 62' is the local copy of the original page (and, typically, the two pages are the same). File 64' is the local copy of embedded object 64, and file 66' is the local copy of embedded object 66. Local files 64' and 66', however, preferably are not made from the Web page itself (as is the case with HTML page 62' in the preferred embodiment). Rather, the embedded objects (e.g., images, is sounds and/or movies) are preferably re-pulled from the network (or otherwise retrieved from the browser cache) while the "Copy in progress" indication page is being displayed. Preferably, a running counter 72 is maintained of the number of copies made so that each copy is unique. In addition, when the operation is carried out, one entry in the Categories page 45 (see FIG. 7C) is made. As also seen in FIG. 9, the Category page 45 is saved to the local storage 70 and includes a pointer 68 to the new page 62'. Activation of the pointer 68 (e.g., via a hypertext link in the Category page or otherwise) pulls the new page 62' and its linked contents (namely, the embedded objects) off the local storage to retrieve the saved Web page.

Figure 10:
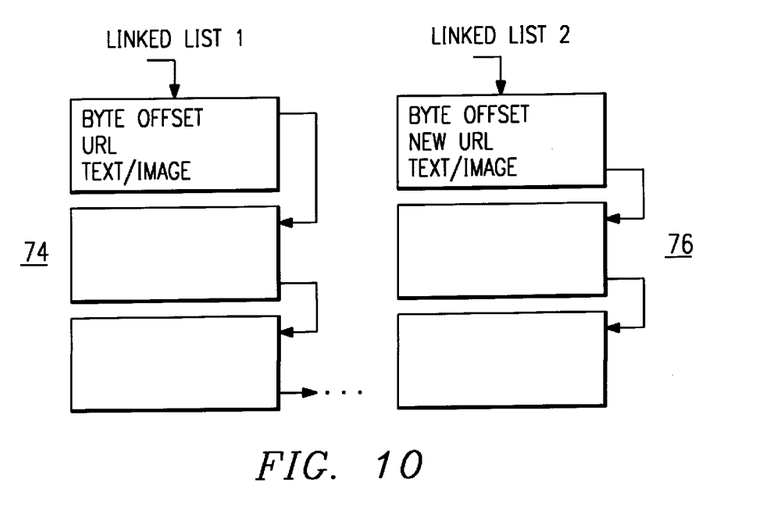
FIG. 10 illustrates representative data structures for use in the Save operation.

The save operation is facilitated by a pair of data structures 74 and 76 as seen in FIG. 10. (These data structures, alternatively, may be construed as a single data structure having first and second portions). Each of these data structures is preferably a "linked list" of entries. Alternatively, an "array" or other known data structure may be used in place of a linked list. Linked list 74 (LL1) is a linked list of URLs in the original file, and this list is preferably created in the order of the links as they appear from the beginning of the file. Thus, each entry of linked list 74 is added to the back of the list. Each entry includes a URL, which is the URL string of hypertext reference <a href> tag, an offset, which represents a byte offset from the beginning of the file pointing to the URL string, and the type of link, such as text or image. Preferably, the "type" is defined by a MIME extension. Linked list 76 (LL2), as will be seen, is a linked list of new URLs, and the items on this list are preferably added by being pushed onto a front of the list. Thus, as compared to LL1, the entries on LL2 appear in the reverse order of byte offsets. Each entry in LL2 includes a URL, which is the file name on the local hard drive, an offset, which represents the byte offset from the beginning of the file pointing to the original URL string, and the type of link, such as text or image.

Figure 11:
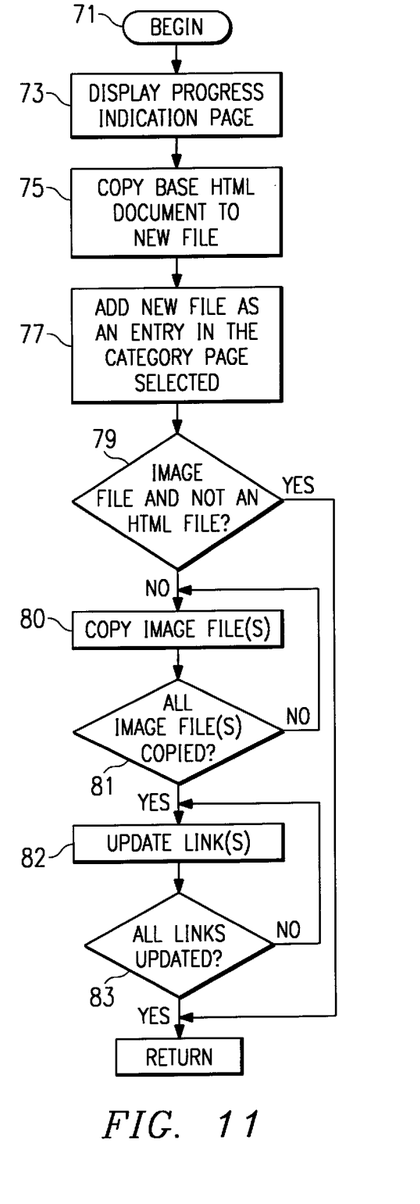
FIG. 11 is a more detailed flowchart of the specific steps used in the Save operation for copying the Web page to a user's local hard drive.

The flowchart of FIG. 11 represents the detailed steps of the Save operation that are used to make a Web page copy on the user's local hard drive (or other storage). It begins at step 71 when the operation is initiated as has been previously described. At step 73, the progress indication page is displayed on the interface. At step 75, the base HTML document is copied to the new file. The routine then continues at step 77 by adding the new file as an entry (e.g., marked as a "Copy") in the category page. A test is then done at step 79 to determine whether the original file is an image file and not an HTML file. If the outcome of the test at step 79 is positive, the routine ends (and returns to the display of the original Web page). If, however, the outcome of the test at step 79 is negative, the routine continues at step 80 to copy the image file(s) in the page. This operation is described in more detail below with respect to FIG. 12. At step 81, a test is done to determine whether all of the image files have been processed. If the outcome of the test at step 81 is negative, the routine cycles. If, however, the outcome of the test at step 81 is positive, the routine continues at step 82 to update each link in the new file. This operation is described in detail in FIG. 13. In essence, however, this step ensures that each link in the new page is either a fully-qualified URL to local path to the hard drive (if the link is to an embedded object) or a fully-qualified URL to a network location (if the link is not associated with an embedded object). A test is done at step 83 to determine whether all of the links have been updated. If the outcome of the test at step 83 is negative, the routine cycles. If, however, the outcome of the test at step 83 is positive, the routine ends (and browser focus returns to the original Web page). This completes the processing.

Figure 12:
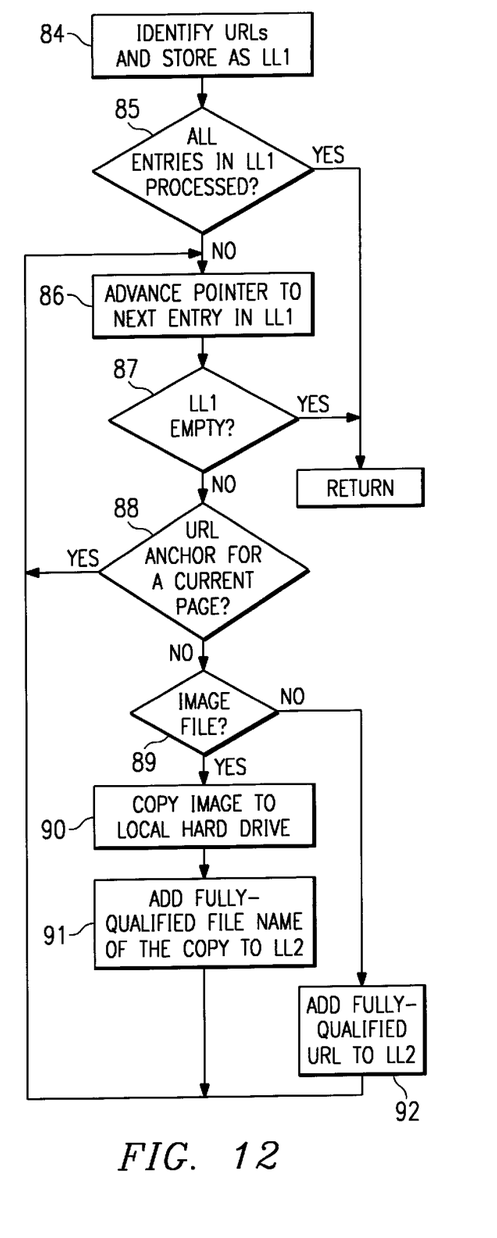
FIG. 12 is a detailed flowchart of a routine for copying an image file of the Web page.

FIG. 12 illustrates a flowchart of the copy image step 80 of FIG. 11. One of ordinary skill will appreciate that the representative embodiment uses images as the embedded objects, although a similar type of process may be carried out for other types of embedded objects. This routine begins at step 84 by identifying the URLs in the original file and storing them in LL1. Preferably, duplicate entries are eliminated. A test is then done at step 85 to determine if all entries in the linked list have been processed. If the outcome of the test at step 85 is positive, the copy image routine terminates. If the outcome of the test at step 85 is negative, however, the routine continues at step 86 to advance a pointer to a next entry in LL1. A test is then performed at step 87 to determine if the linked list is empty. If so, the routine ends. If, however, the linked list is not empty, a test is done at step 88 to determine whether the URL is merely an anchor for a current page (e.g., if the URL begins with "#"). If the outcome of the test at step 88 is positive, the routine continues at step 86 by advancing the pointer to the next entry in LL1. If, however, the outcome of the test at step 88 is negative, the routine continues at step 89 to check for image files.

If the embedded object is an image file, the routine continues at step 90 to copy the image file to the local hard drive. At step 91, the fully qualified URL of the copy of the file is then added to LL2. The routine then returns to step 86 to advance the pointer to the next entry in LL1. If the outcome of the test at step 89 indicates that the hypertext reference is not associated with an image file, then the routine branches to step 92 to add the fully-qualified URL to LL2; thereafter, control returns to step 86. It should be appreciated that steps 89 through 92 may need to be repeated recursively to copy embedded image files within a frame tag of an HTML frameset. Also, these operations are likewise performed with respect to content within an <img> or <embed> tag. It should also be noted that the steps 91 and 92 ensure that there are no relative references to any base reference tags. This completes the image copy processing.

Figure 13:
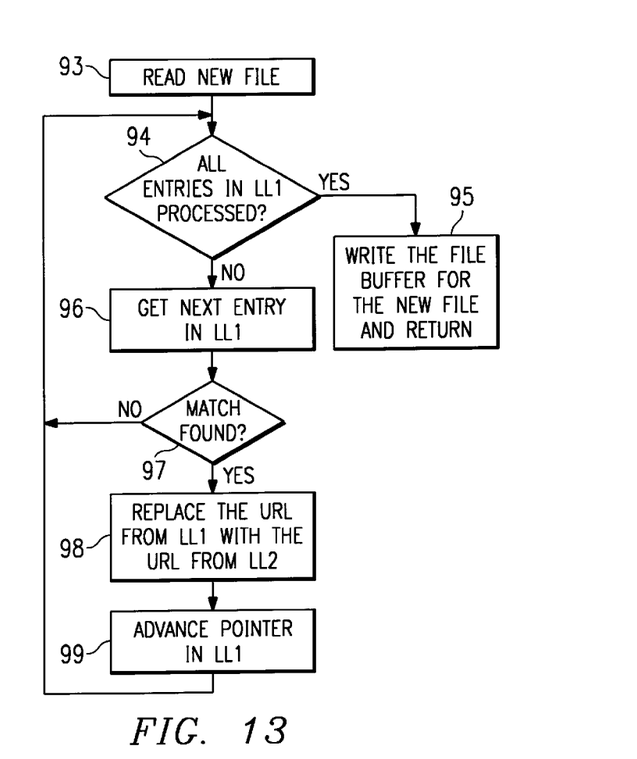
FIG. 13 is a detailed flowchart of a routine for updating the links in the saved page.

FIG. 13 is a flowchart of the update link step 82 of FIG. 11. It begins at step 93 by reading the new file. At step 94, a test is done to determine whether all entries in LL1 have been processed. If the outcome of the test at step 94 is positive, the routine continues at step 95 to write the file buffer to the new file and then terminate. If, however, the outcome of the test at step 94 is negative, the routine continues at step 96 to get the next entry in LL1. At step 97, a test is made to determine if a match (with an entry in LL2) has been found. If so, the routine continues at step 98. This step replaces (in the file buffer) the URL from LL1 with the URL from LL2 at the specified offset. The routine then continues at step 99 by advancing a pointer to the next entry in LL1. The inner loop then cycles back to just before step 94. If the outcome of the test at step 97 is negative, which indicates that no match can be found, the routine also branches to step 94. Thus, according to the update routine, a fully-qualified URL is substituted for each hypertext reference in the base document. Each link in the new page is either a fully-qualified URL to a local path on the hard drive (if the link is to an embedded object) or a fully-qualified URL to a network location (if the link is not associated with an embedded object). This completes the processing.

It should be appreciated that the reverse ordering of LL2 provides several performance advantages during the link update routine. First, adding the entries to the head of LL2 is a very fast operation. Moreover, when the link update routine is searching (at step 96) for a match, if the byte offset in LL1 is less than the byte offset in LL2, then the search can terminate with respect to the entry. This speeds the update processing, and thus reduces the overall time necessary to effect the Save operation.

Thus, according to a preferred embodiment of the invention, the save operation begins by copying the base HTML document to the client local storage and establishing a pointer to the copied base document to facilitate subsequent retrieval of the saved copy. The step of copying the base HTML document to the client local storage may be carried out by the browser as an inherent operation. A first linked list of the hypertext references in the base document is then generated. Each entry of the first linked list is preferably added to a back of the list. Thereafter, and for each hypertext reference in the first linked list, the following operations are performed. If the hypertext reference refers to an embedded object in the base HTML document, the embedded object is saved on the client local storage and the file name of the saved embedded object is stored (as a fully-qualified URL) in a second linked list. If the hypertext reference does not refer to an embedded object in the base HTML document, the fully-qualified URL of the hypertext reference is stored in the second linked list. Each entry of the second linked list is preferably added to the head of the second linked list. Then, the fully-qualified URLs of the second linked list (including those associated with the stored images) are updated to point to the files located on the client local storage. At the end of this operation, there is a new HTML page with links for images pointing to files on the local hard drive. When the user desires to retrieve the copied page, a link to the pointer is activated. The saved page comes up essentially instantaneously because all the images are on the hard drive and no network access is required.

Preferably, the system maintains how many copies are made and store the copies in separate directories (namely, the "categories"). The image files are sequentially numbered, and the pathname for each copied page is preferably unique.

Figure 14:
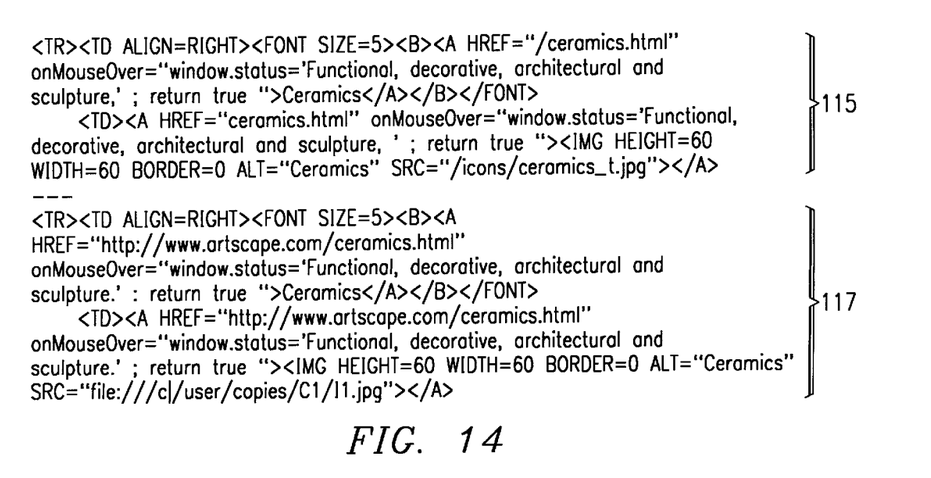
FIG. 14 illustrates exemplary changes to the HTML source code of a Web page that has processed by the Save operation.
Figure 15:
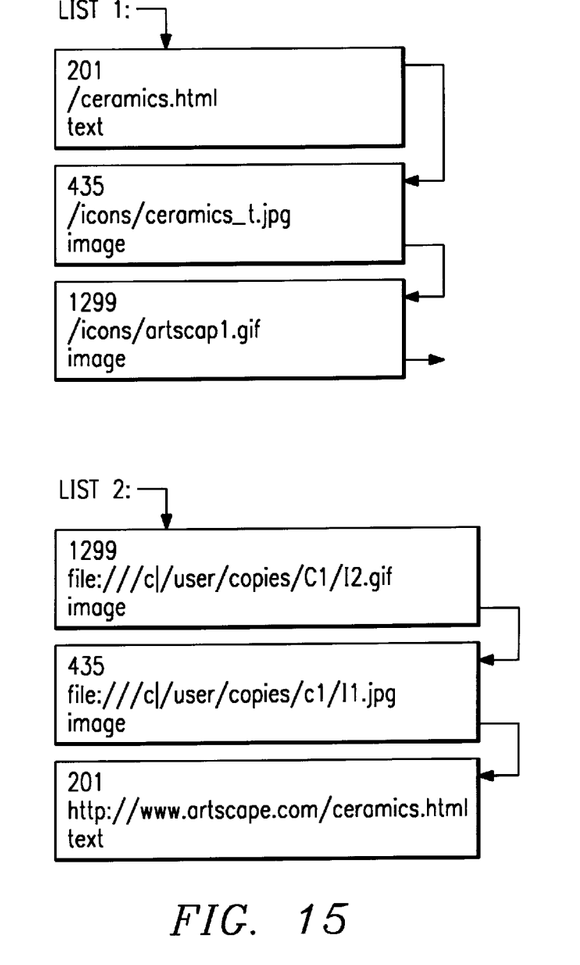
FIG. 15 represents the linked lists associated with the source code portions shown in FIG. 14.

FIG. 14 illustrates the substitution of the <a href> tags processed according to the above-identified technique. In particular, the upper portion 115 of the code represents the original HTML source code. In the lower portion 117, each of the href tags has been modified to point to the local storage. FIG. 15 represents the linked lists associated with the code portions.

Figure 16:
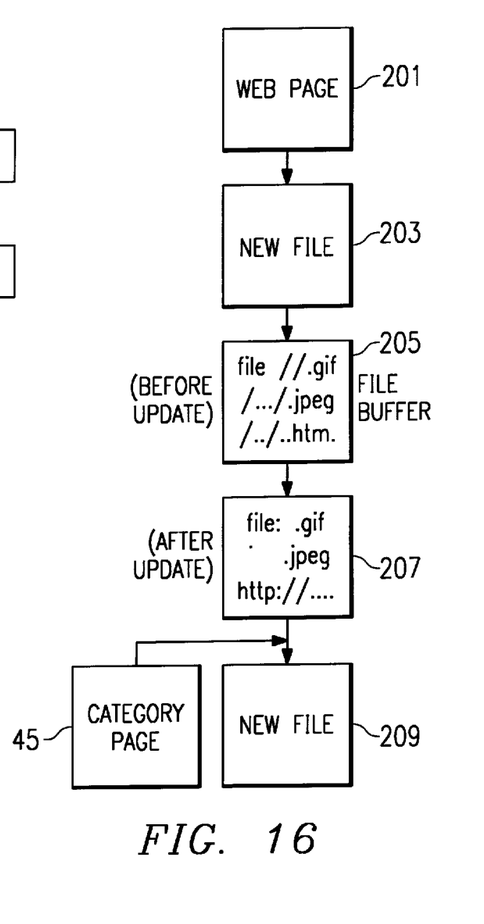
FIG. 16 illustrates how a file buffer is used in conjunction with a preferred method of the present invention.

FIG. 16 summarizes the basic operation of the inventive method. The Web page 201 is the page to be saved. After the first step of the save operation, the "new file" 203 is the same as the Web page. This new file is then placed in the file buffer 205 in client memory. After the links are updated, the file buffer memory contents are represented as 207. The contents of the file buffer are then written back to the new file 209. The Category page 45 points to the new file.

The present invention may be implemented as part of the browser application or as a separate downloaded plug-in. Alternatively, the mechanism is any set of program code instructions, such as a set of instructions in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention may be practiced with Web page(s) formatted according to alternative markup languages including, without limitation, SGML (Standard Generalized Markup Language) and XML (Extended Markup Language).

In addition, the term "Web appliance" should be broadly construed to cover the display system illustrated in FIGS. 2A–2D, as well as any other machine in which a browser application is associated with some television class or other display monitor. As has been previously described, the invention may also be practiced in any conventional client machine connected to the Internet, within an Intranet, or otherwise connected to a computer network.

The present invention provides significant advantages. The location of the copied files is transparent to the user, which is especially appealing to users who are not familiar with computers. The user can view a copy of a page that has been stored within a category page interface. Preferably, the "snap shot" of the base HTML page is a one level deep copy. Any browser can be used to view the pages copied using the inventive technique. The file directory (for the copied pages (e.g. c:\user\copies\c1\c1.htm, i1.jpg, etc.)) is self-contained and needs no other files or system dependent information to view the copied page. As a result, the invention may be used with an e-mail application to simplify the transfer of the saved Web page. In particular, the user simply attaches a copy of the directory contents to the e-mail and all embedded files get transferred. This is a simple and efficient means of e-mailing a Web page.

Having thus described our invention, what we claim as new and desire to secure by Letters Patent is set forth in the following claims.

What is claimed is:

1. A method of saving a Web page to a client local storage for subsequent retrieval, the Web page comprising a base document having a plurality of hypertext references, wherein at least one of the hypertext references is associated with an embedded object in the base document, the method comprising the steps of:

(a) copying the base document to the client local storage and establishing a pointer to the copied base document;

(b) for the hypertext reference associated with the embedded object, saving to the client local storage a file copy of the embedded object; and (c) substituting a fully-qualified URL for each hypertext reference in the copied base document in step (a).

2. The method as described in claim 1 wherein the fully-qualified URL for the hypertext reference associated with the file copy of the embedded object is a path name to the client local storage.

3. The method as described in claim 2 wherein the fully-qualified URL for a hypertext reference that is not associated with the file copy is a network URL.

4. The method as described in claim 1 further including the step of:

(d) retrieving the Web page by activating a link to the pointer.

5. The method as described in claim 4 wherein the link to the pointer is associated with a given category.

6. The method as described in claim 1 wherein the file copy of the embedded object is pulled from a server.

7. The method as described in claim 1 wherein the file copy of the embedded object is retrieved from a client cache.

8. The method as described in claim 1 wherein the embedded object is a file selected from the group consisting essentially of image files, audio files and video files.

9. A method of saving a Web page to a client local storage for subsequent retrieval, the Web page comprising a base document and a plurality of hypertext references, wherein at least some of the hypertext references are associated with embedded objects, comprising the steps of:

(a) copying the base document to the client local storage and establishing a pointer to the copied base document;

(b) for each hypertext reference associated with an embedded object, saving to the client local storage a file copy of the embedded object; and (c) substituting a fully-qualified URL for each hypertext reference in the base document copied in step (a), wherein the fully-qualified URL for the hypertext reference associated with each file copy of an embedded object is a unique path name to the client local storage.

10. The method as described in claim 9 wherein the step of saving the file copy includes pulling the file from a server identified by the fully-qualified URL.

11. The method as described in claim 9 wherein the step of saving the file copy includes retrieving the file from a client cache.

12. The method as described in claim 9 further including the step of displaying a notification to a user that a copy of the Web page is being made as steps (a) through (c) are carried out.

13. The method as described in claim 12 further including the step of:

(d) retrieving the Web page by activating a link to the pointer.

14. A computer program product in computer-readable media for use in saving and retrieving a Web page to and from a client local storage, the Web page comprising a base document having a plurality of hypertext references, wherein at least some of the hypertext references are associated with embedded objects, comprising:

program code means, responsive to generation of a copy of the base document in the client local storage, for establishing a pointer to the copied base document;

program code means for generating a first data structure of the hypertext references in the copied base document;

program code means for saving to the client local storage a file copy of each embedded object;

program code means for storing into a second data structure a fully-qualified URL of each hypertext reference in the copied base document; and program code means for updating the fully-qualified URLs of the second data structure to point to the client local storage.

15. The computer program product as described in claim 14 further including means for retrieving the saved Web page from the client local storage.

16. The computer program product as described in claim 14 further including means for deleting the saved Web page from the client local storage.

17. The computer program product as described in claim 14 further including means for displaying a progress indication page while the Web page is being saved.

18. A computer connectable to a computer network, comprising:

a local storage;

a processor;

an operating system;

a browser for retrieving and displaying Web pages from the computer network; and program code means, responsive to generation of a copy of the base document in the client local storage by the browser, for establishing a pointer to the copied base document;

program code means for generating a first data structure of the hypertext references in the copied base document;

program code means for saving to the client local storage a file copy of each embedded object;

program code means for storing into a second data structure a fully-qualified URL of each hypertext reference in the copied base document; and program code means for updating the fully-qualified URLs of the second data structure to point to the client local storage.

19. The computer as described in claim 18 further including means for retrieving the saved Web page from the client local storage.

20. The computer as described in claim 18 further including means for deleting the saved Web page from the client local storage.

21. The computer program product as described in claim 18 further including means for displaying a progress indication page while the Web page is being saved.

22. A data processing system, comprising:

a remote control unit; and a base unit connectable to a monitor for providing Internet access under the control of the remote control unit, the base unit comprising:

a local storage;

a processor having an operating system;

a browser application run by the operating system;

means, responsive to a user request to copy a Web page input from the remote control unit, for displaying a page copy progress indication and concurrently saving the Web page to the local storage by storing a base HTML document and substituting at least one hypertext reference therein with a link to a fully-qualified file on the local storage.

23. A method of saving a Web page to a client local storage for subsequent retrieval, the Web page comprising a base document having a plurality of hypertext references, wherein at least one of the hypertext references is associated with an embedded object in the base document, the method comprising the steps of:

(a) copying the base document to the client local storage and establishing a pointer to the copied base document;

(b) for the hypertext reference associated with the embedded object, saving to the client local storage a file copy of the embedded object; and (c) substituting a fully-qualified URL for each hypertext reference in the base document in step (a), wherein the embedded object is a file selected from the group consisting essentially of image files, audio files and video files and wherein the image file is a file selected from the group consisting essentially of .gif type files, .jpeg type files and .png type files.

* * * * *